United States Patent

Nussbaum et al.

[15] 3,678,467

[45] July 18, 1972

[54] MULTIPROCESSOR WITH COOPERATIVE PROGRAM EXECUTION

[72] Inventors: Eric Nussbaum, St Charles; Wing Noon Toy, Glen Ellyn, both of Ill.; Melvin Neil Woinsky, Dover, N.J.

[73] Assignee: Bell Telephone Laboratories Incorporated, Murray Hill, N.J.

[22] Filed: Oct. 20, 1970

[21] Appl. No.: 82,354

[52] U.S. Cl. ..........340/172.5

[51] Int. Cl. ..........G06f 15/16

[58] Field of Search ..........340/172.5

[56] References Cited

UNITED STATES PATENTS

| | | | |
|---|---|---|---|
| 3,287,705 | 11/1966 | Rosenblatt et al. | 340/172.5 |
| 3,303,474 | 2/1967 | Moore et al. | 340/172.5 |
| 3,312,951 | 4/1967 | Hertz | 340/172.5 |
| 3,374,465 | 3/1968 | Richmond et al. | 240/172.5 |
| 3,444,528 | 5/1969 | Lovell et al. | 340/172.5 |
| 3,480,914 | 11/1969 | Schlaeppi | 340/172.5 |
| 3,517,174 | 6/1970 | Ossfeldt | 340/172.5 X |
| 3,566,357 | 2/1971 | Ling | 340/172.5 |
| 3,238,506 | 3/1966 | Jung et al. | 340/172.5 |

*Primary Examiner*—Paul J. Henon
*Assistant Examiner*—Sydney R. Chirlin
*Attorney*—R. J. Guenther and R. B. Ardis

[57] ABSTRACT

Disclosed herein is a multiprocessor control for a communications switching system wherein an instruction stored in the program order register of one processor is decoded both within that processor and within another processor to initiate and control cooperative data processing operations in both processors. Data and control information is exchanged between processors by means of cross-coupled gating buses which are employed within each respective processor for communication among its own registers and data processing functional circuits.

18 Claims, 14 Drawing Figures

INVENTORS E. NUSSBAUM
W. N. TOY
M. N. WOINSKY

BY Daniel E. Nester

ATTORNEY

MULTIPROCESSOR WITH COOPERATIVE PROGRAM EXECUTION

BACKGROUND OF THE INVENTION

1. Field of the Invention

This invention is concerned with program controlled multiprocessor systems wherein an instruction obtained by one processor from memory can be executed in both the processor obtaining the instruction and in another processor. This arrangement is of particular but not exclusive interest to multiprocessor systems in which one processor controls both itself and another processor to diagnose troubles detected in the operation of the other processor.

2. Description of the Prior Art

Multiprocessor systems often are employed in system environments requiring extremely high reliability of operation. An example of such a system environment is the use of a multiprocessor as the control element for an industrial process or a communications switching system. Often, in such an environment, a plurality of processors are synchronously operated in accordance with identical programs and input data with only one on-line processor exerting system control at any given time. The other off-line processor or processors are used to check the operation of the processor in control by means of matching arrangements which verify the equivalence of data flow and processing results within all the processors. In the event of a detected error, system control can be transferred from one processor to another thereby insuring continuous operation of the overall system.

In multiprocessor systems, to coordinate system functions it is advantageous to provide for information transfer between the respective processors of the system. Such information can be employed to control selectively the accessability of the respective processors to various other system elements such as memory and input/output elements. Such information also can be employed for communication between programs being run cooperatively on more than one processor. In high reliability multiprocessors employing redundant control capability, such as those mentioned above, information can be transferred from the processor in control of the system to other processors to control diagnostic testing of a faulty processor. All of the above is disclosed in the copending application of R. W. Downing, F. F. Taylor, H. F. May, and W. Ulrich, Ser. No. 334,875, filed Dec. 31, 1963, now U.S. Pat. No. 3,570,008, issued Mar. 9, 1971, which describes a program controlled communication switching system.

In most multiprocessor arrangements data transfer between processors is implemented by means of a buffer memory accessible to both processors. Often this is accomplished by use of a specially designated area of memory which is reserved for transfer of information between processors. In this type of arrangement, each processor must be independently capable of accessing memory. Where a processor is in trouble and unable to access memory in the usual way, it is necessary for the other processor to direct control signals to both the memory and the processor in trouble so that information read from a specified memory location will be accepted by the processor in trouble. This arrangement for inter-processor communication requires substantial special circuitry and additionally employs a number of memory read and write cycles to achieve the information transfer. Such an arrangement is disclosed in the aforenoted Downing et al. application.

SUMMARY OF THE INVENTION

In accordance with this invention, the program order register of one processor in a multiprocessor system is connected to command translators in a plurality of processors in the multiprocessor system. Instructions can be decoded in more than one processor and can be executed cooperatively in more than one processor at the same time. The decoding function in all processors of a particular instruction is not necessarily identical. Thus, in response to a single instruction obtained from memory by one processor, a plurality of processors simultaneously can perform similar or different data processing functions.

In each data processor the data processing circuits and the registers, which store the data upon which data processing functions are executed by means of the data processing circuits, are each connected to a program gating bus. This provides bidirectional communication access to and from all registers and data processing circuits by way of the program gating bus within one processor. The program gating bus of each processor is connected through controllable gating elements to the program gating bus of the other processor or processors. This provides a transmission path by means of which data can be transferred selectively from any register in one processor to any register in another processor. Thus, data can be transferred directly between processors without resorting to time consuming special read and write operations with respect to a common memory. The provision of a connection between the program order register of one processor and the command translator of another processor permits a single instruction obtained by one processor to define and initiate the different gating operations within both processors which provide for the transfer of information from a specified register in one processor to a specified register in the other processor.

Each processor includes a bistable element which, when in one stable state, e.g., SET, blocks outputs of the command translator of that processor and inhibits the clock pulses normally used for resetting the various registers in that processor. In order words, the processor is "frozen" in the particular state it was in when the bistable element was placed in a SET condition. Selective control of the states of this bistable element in response to instructions obtained by another processor, in combination with transfers of data to and from the other processor, can be used to exercise and check the "frozen" processor on a per cycle or a per instruction basis. Also, the "frozen" processor can be preset with specific address information and caused to execute a specific sequence of program orders to verify the proper operation of the processor.

It is an object of this invention to facilitate the transfer of information between the respective processors of a multiprocessor.

It is a further object of this invention to increase the flexibility and speed of the operations within a multiprocessor system with respect to control of one processor by another processor.

In accordance with one feature of this invention, an instruction obtained from memory by one processor is decoded in a plurality of processors to achieve simultaneous execution of cooperative or independent data processing functions by both processors responsive to the instruction.

In accordance with another feature of this invention, the transmission buses within each processor for communicating between registers and data processing circuits of that processor are interconnected by selectively operable gating arrangements to permit speedy transfer of information between the processors.

The above and other objects and features of this invention will be more readily understood from the following description when read with respect to the drawings in which:

FIG. 1 is a block diagram which shows a switching network, the peripheral access circuits and a temporary memory access circuit 1400 of a communications switching system which is an illustrative embodiment of a system environment in which the present invention advantageously can be employed;

FIGS. 2–5 comprise a schematic diagram of one program controlled main processor 2000;

FIGS. 6–10 comprise a schematic diagram of another program controlled main processor 2001 and its associated memory access 1401;

GENERAL DESCRIPTION (FIG. 13)

Figure 1:
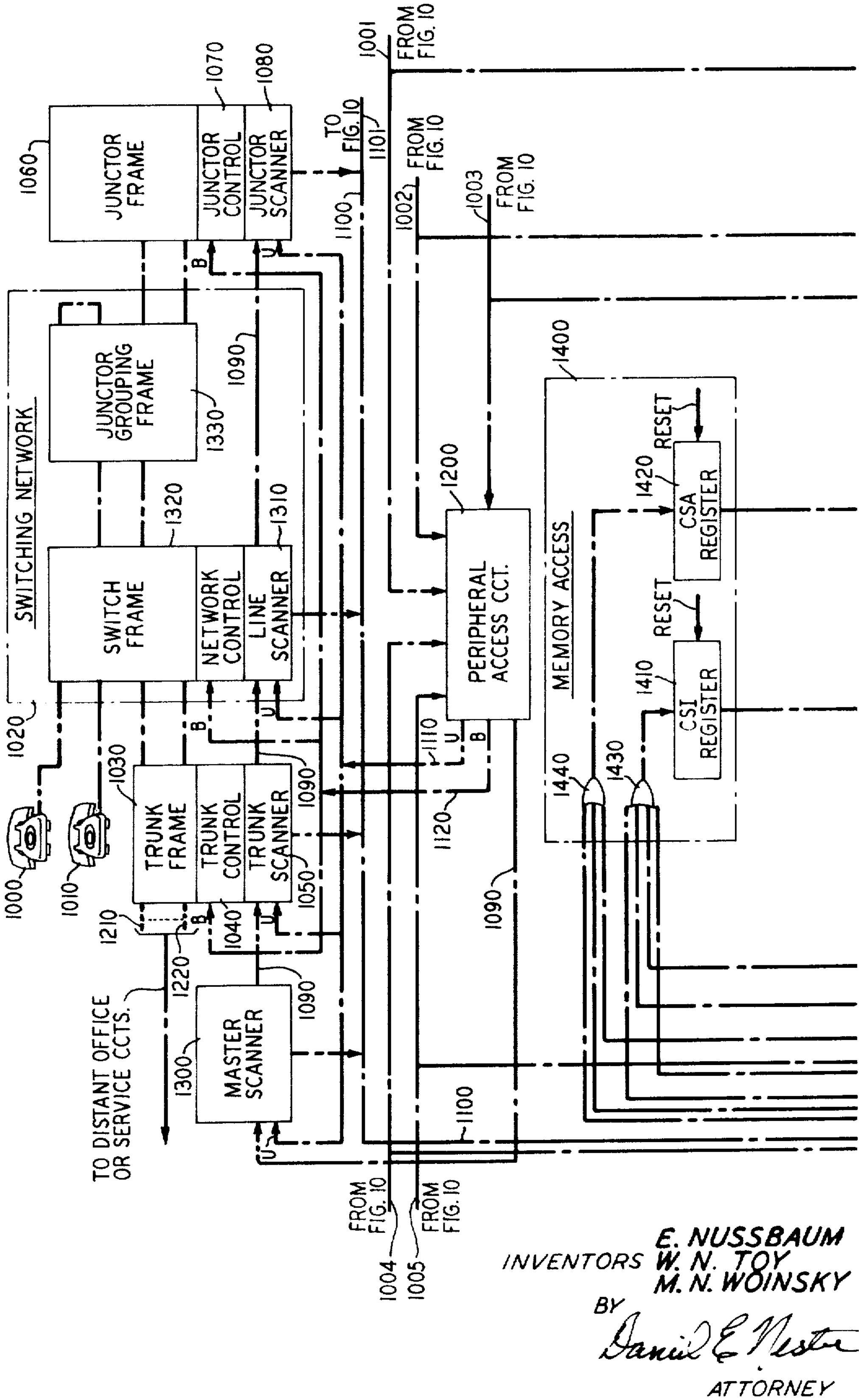
Figure 2:
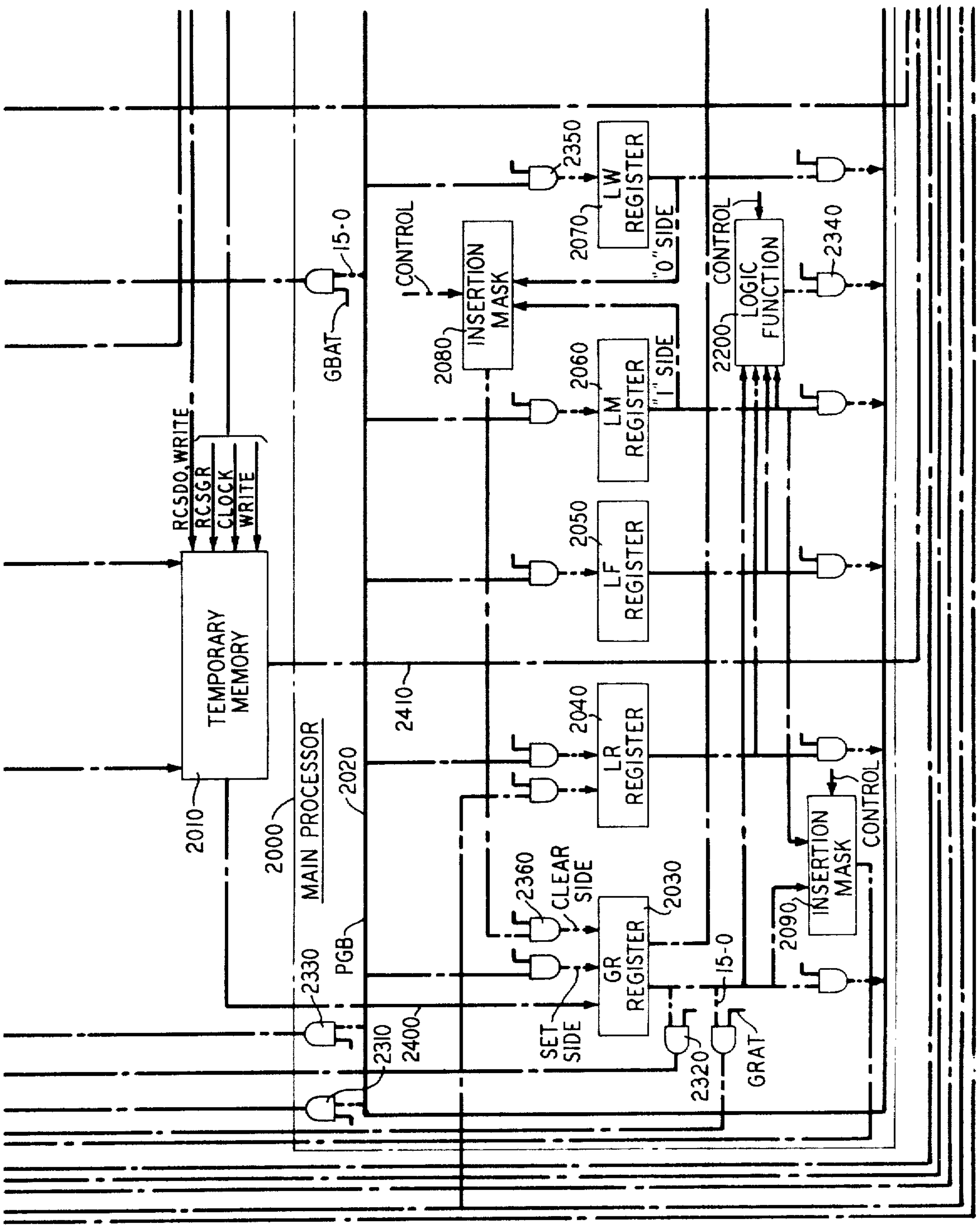
Figure 3:
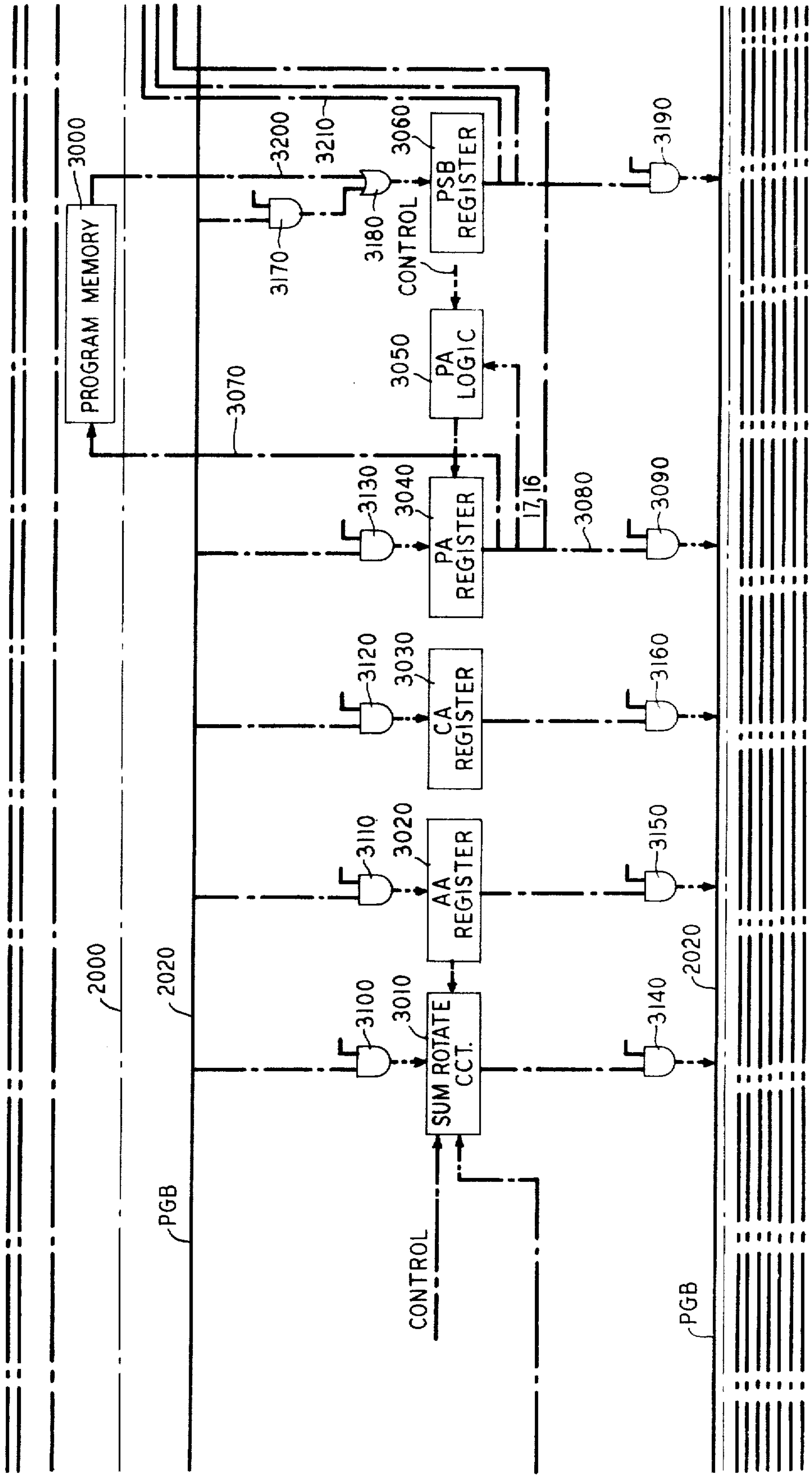
Figure 4:
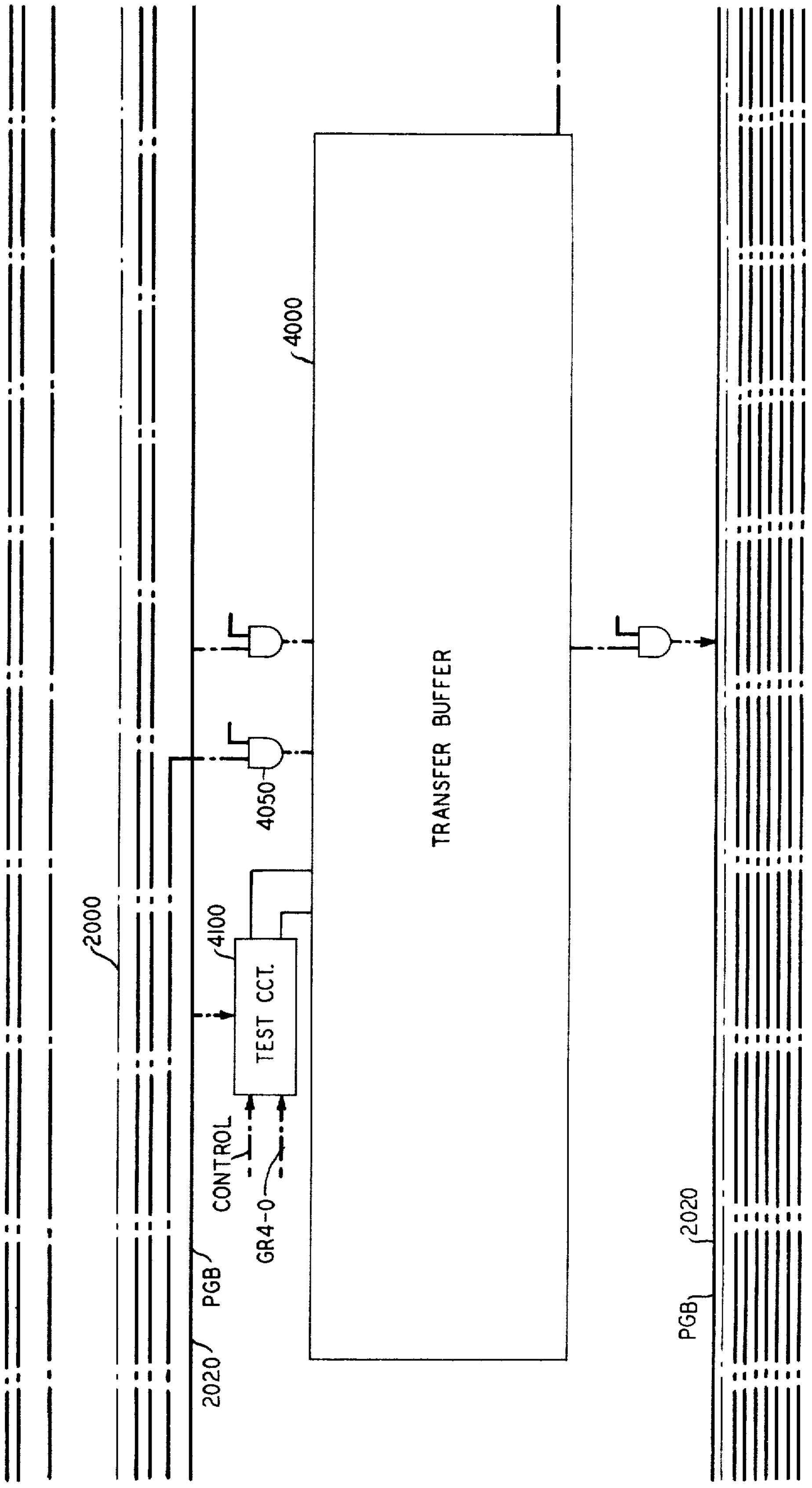
Figure 5:
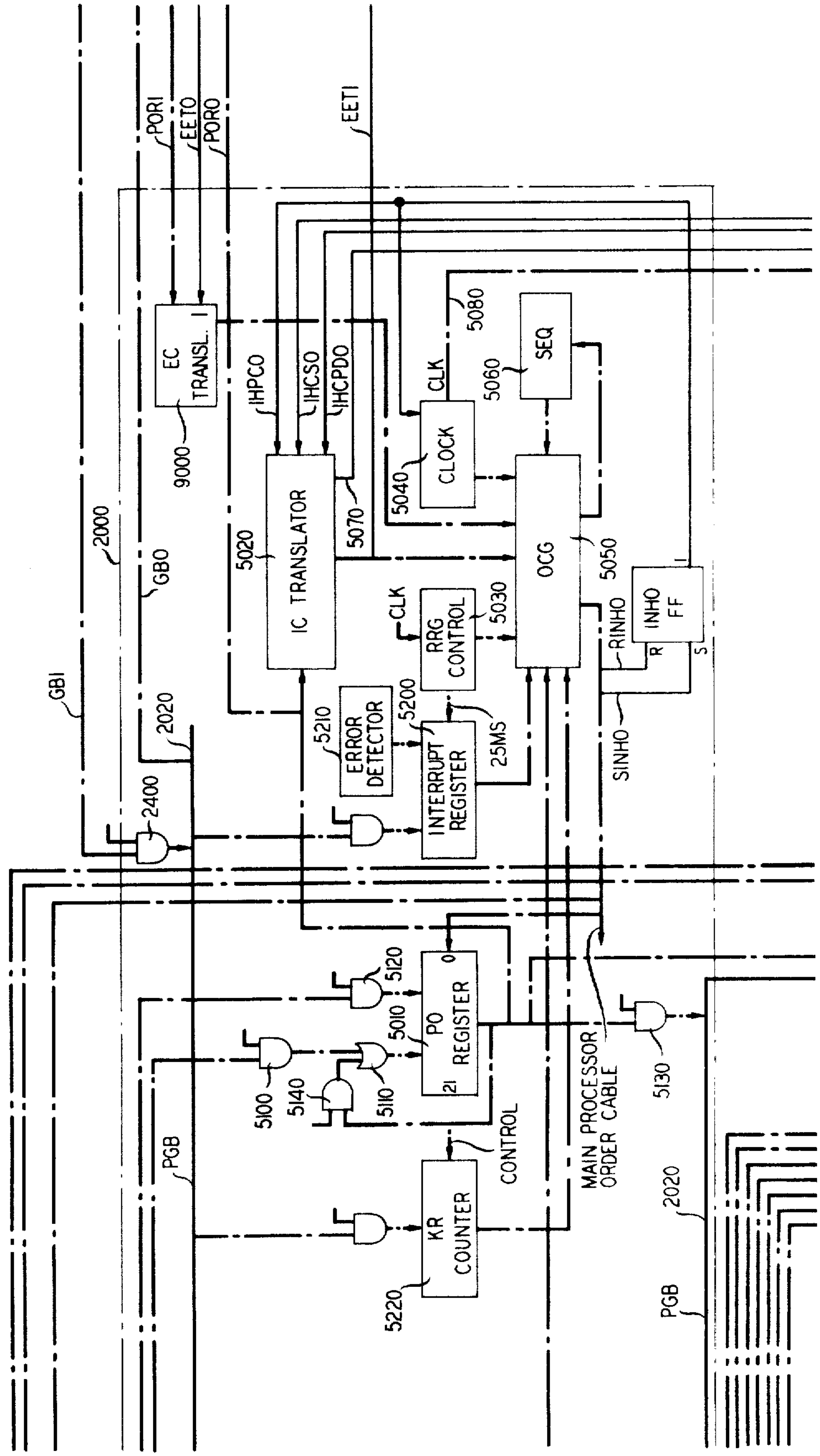
Figure 6:
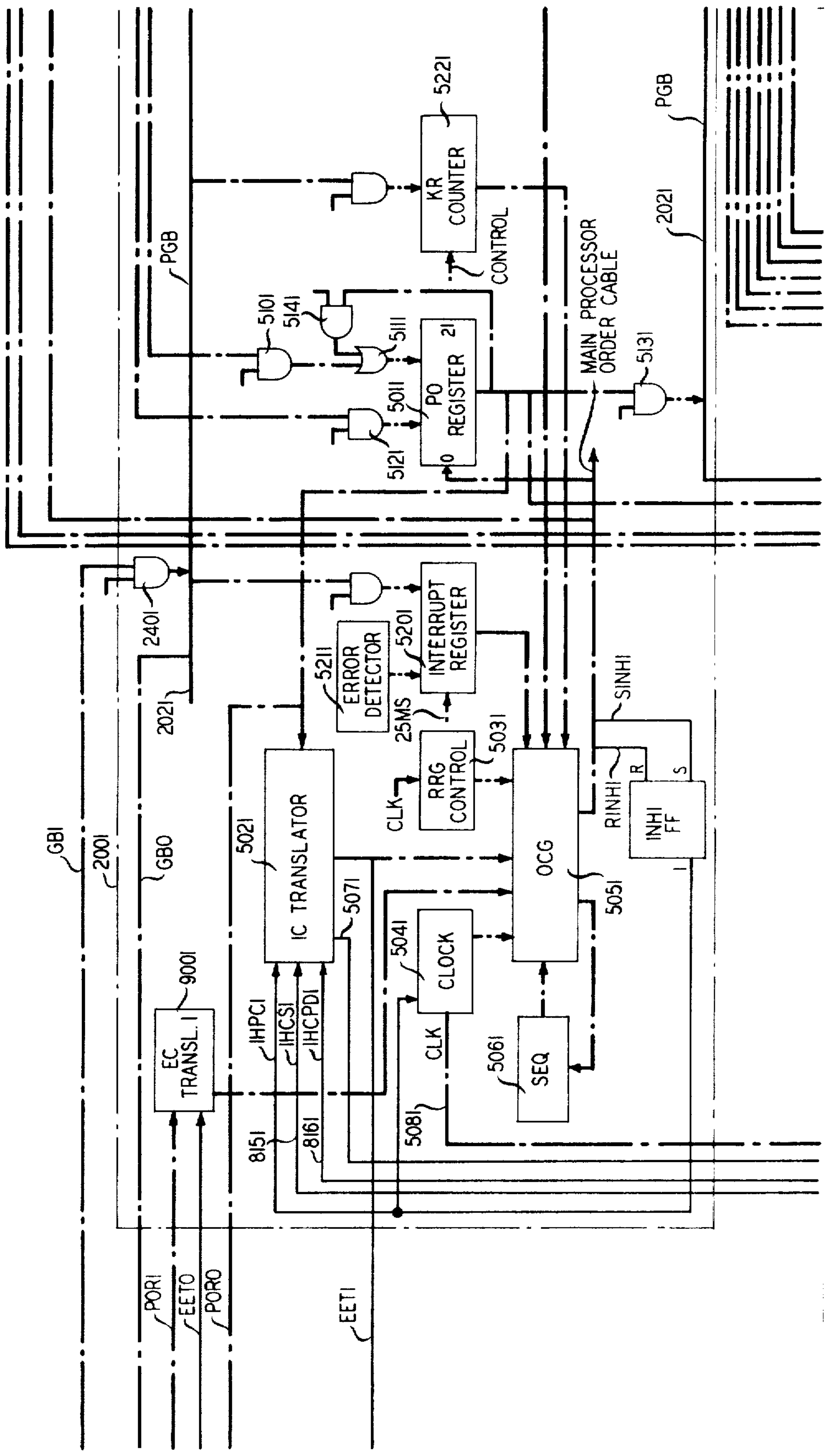
Figure 7:
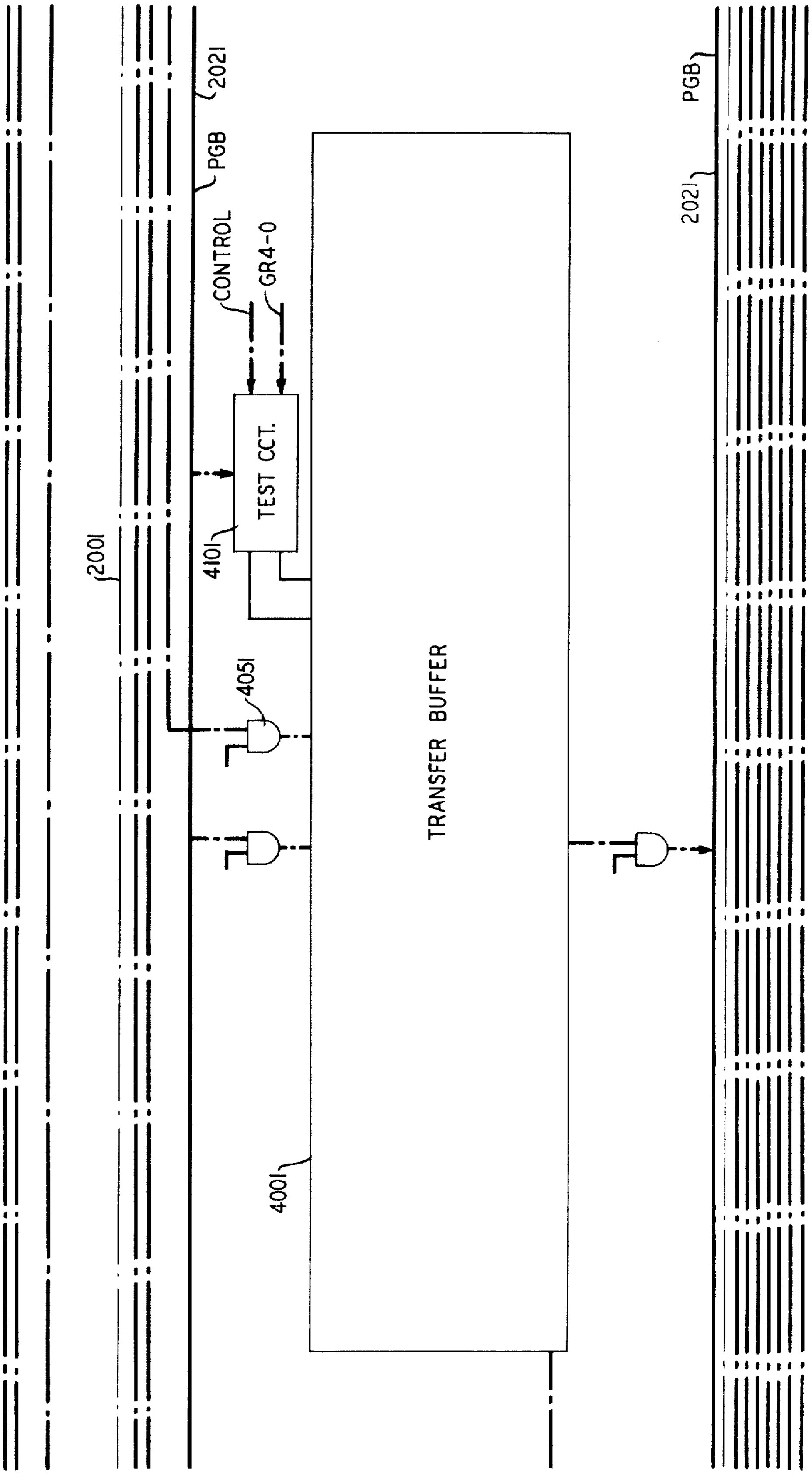
Figure 8:
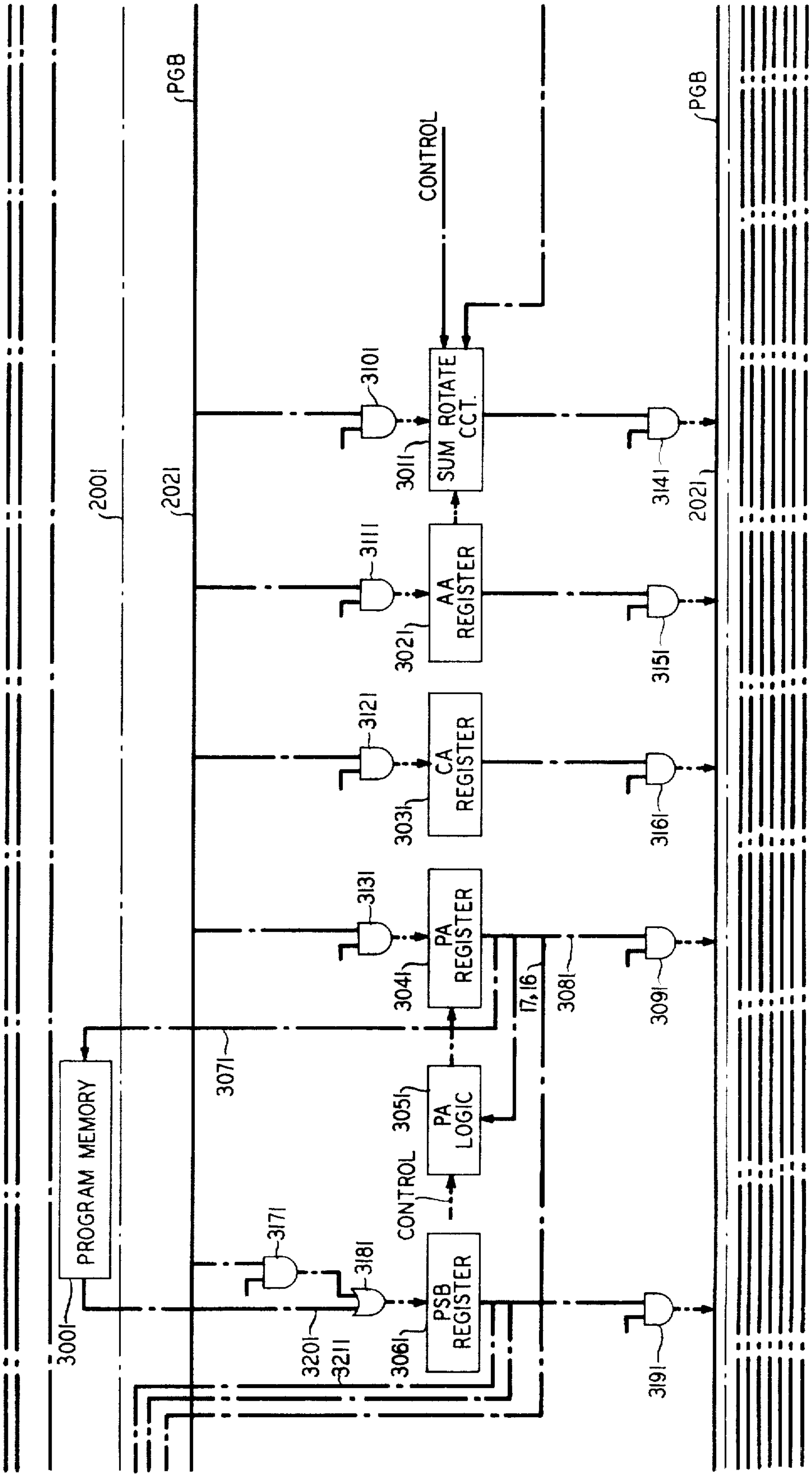
Figure 9:
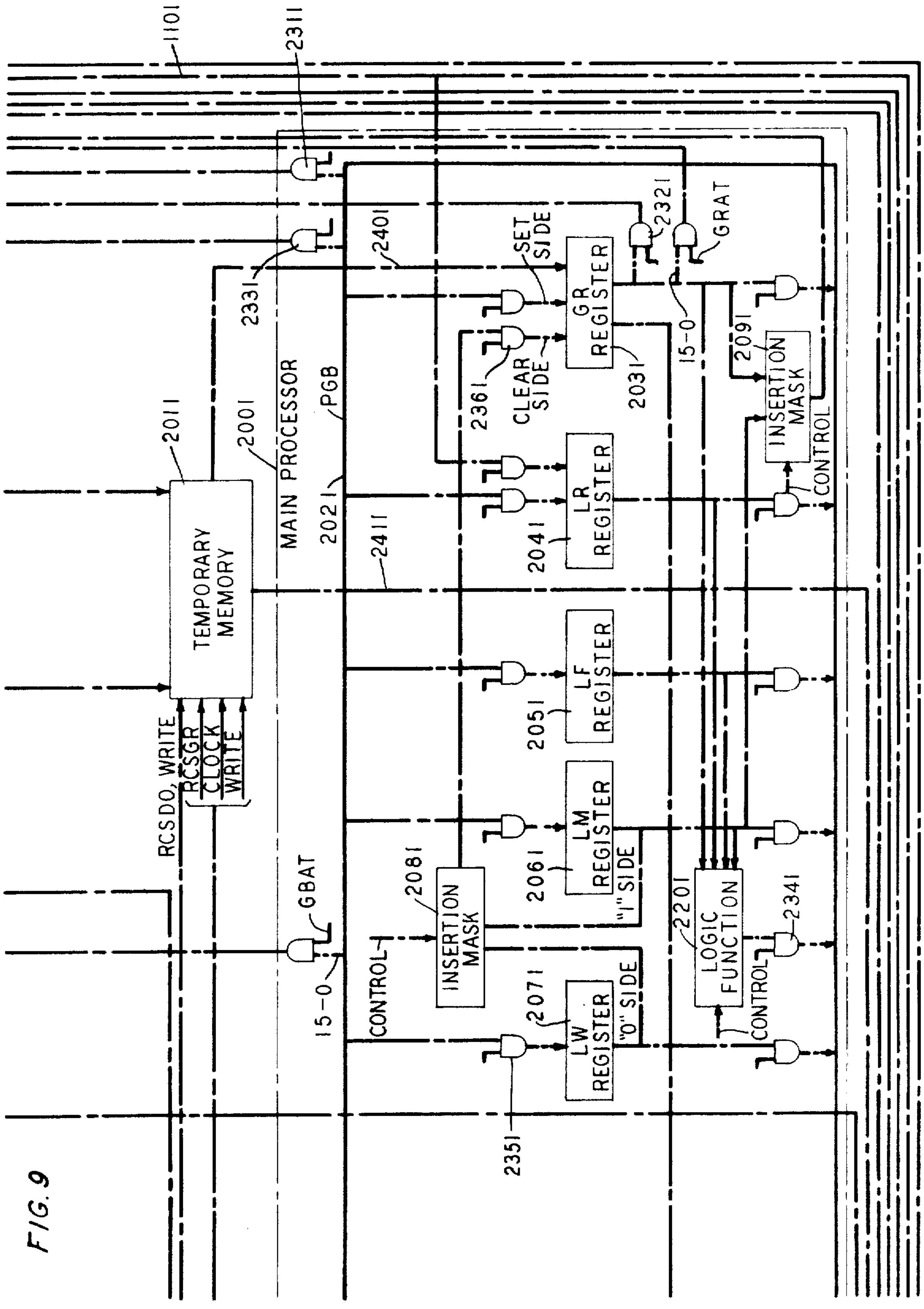
Figure 10:
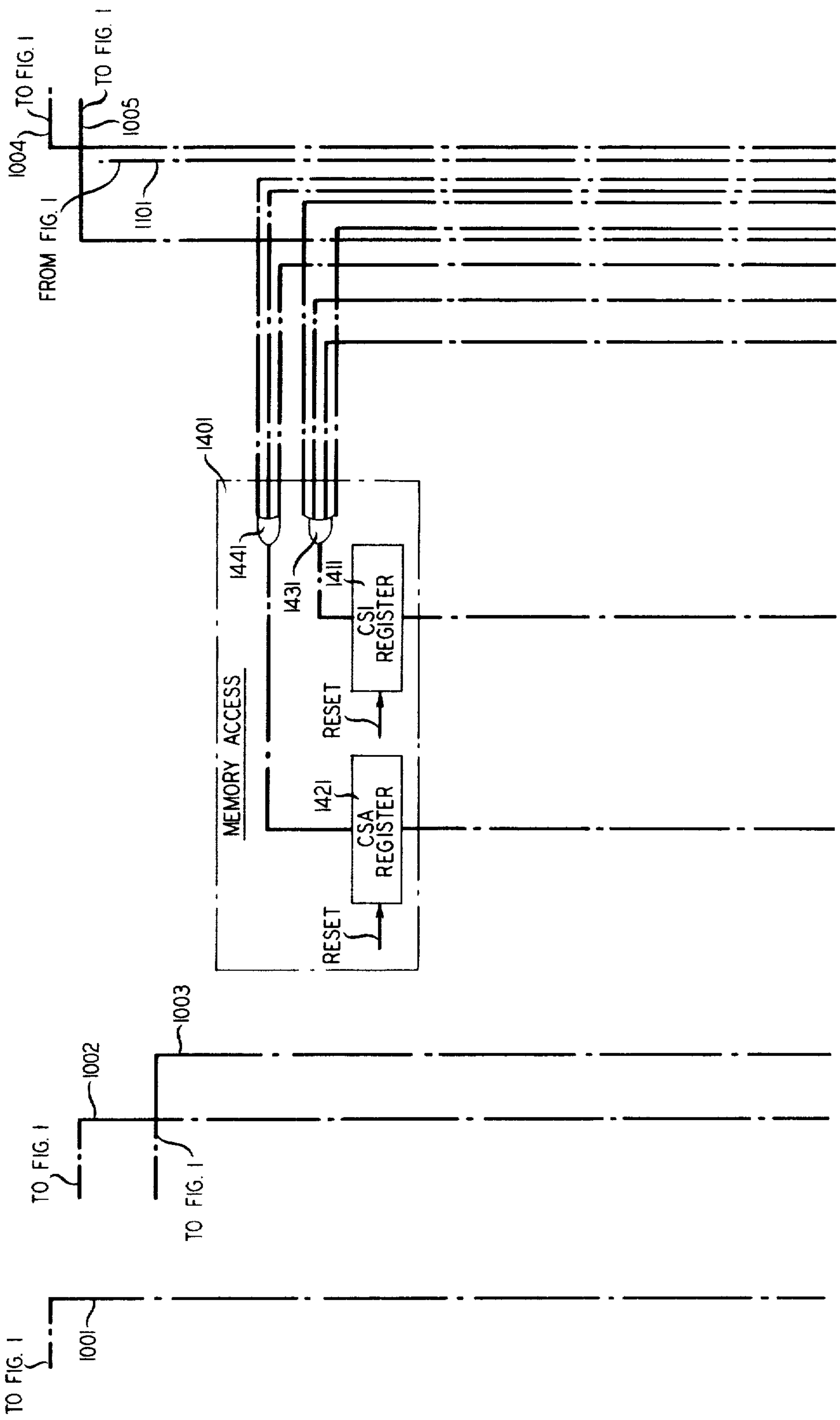
Figure 11:
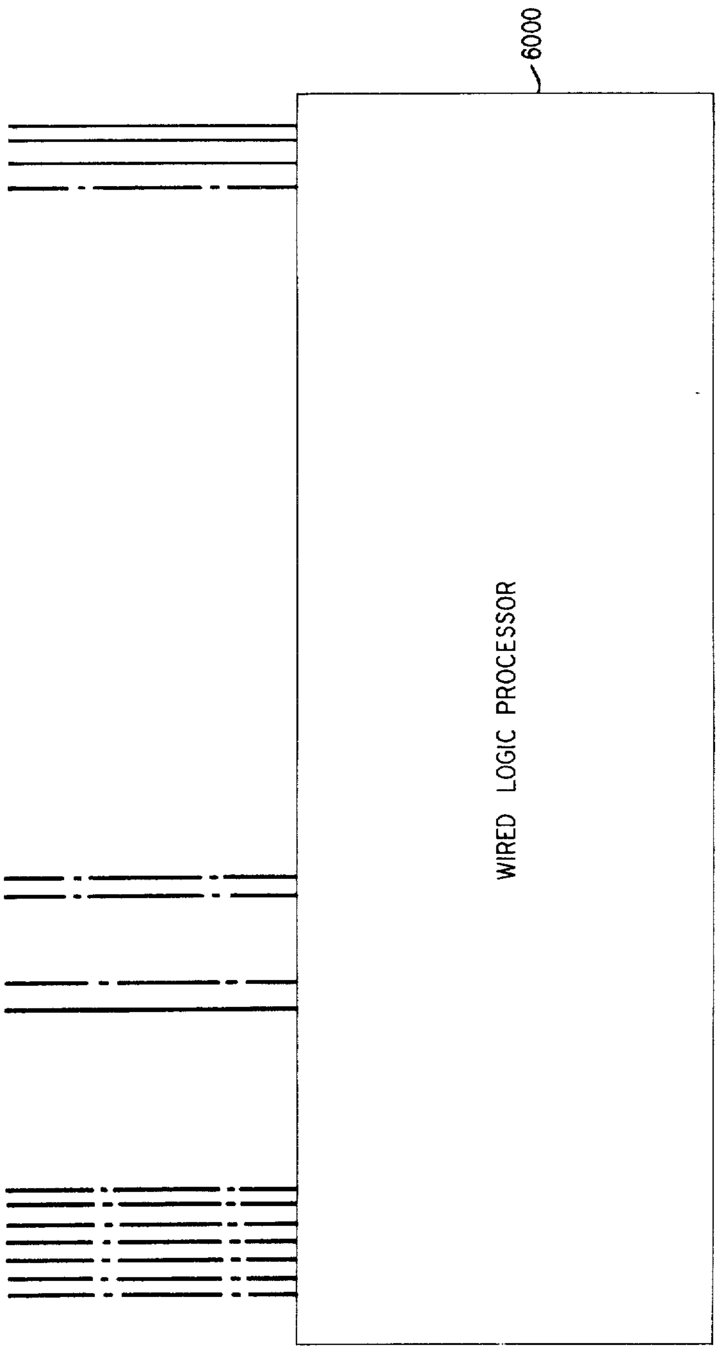
FIGS. 11–12 represent auxiliary wired logic processors 6000 and 6001.
Figure 14:
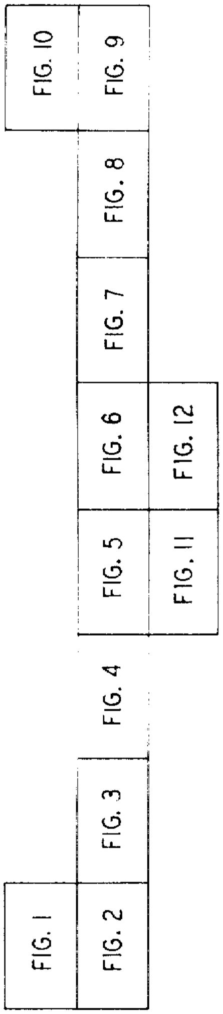
FIG. 14 is a keysheet showing the arrangements of FIGS. 1–12 above.
Figure 12:
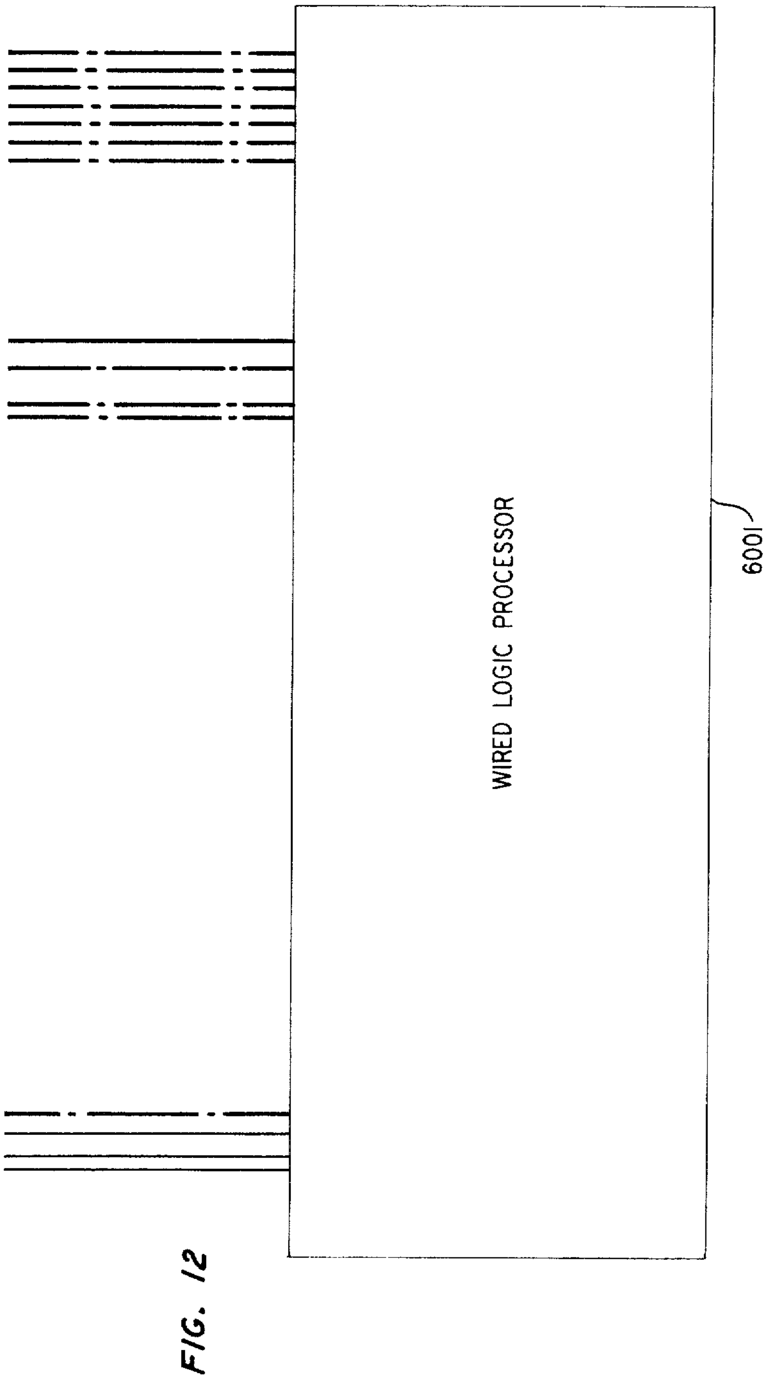
Figure 13:
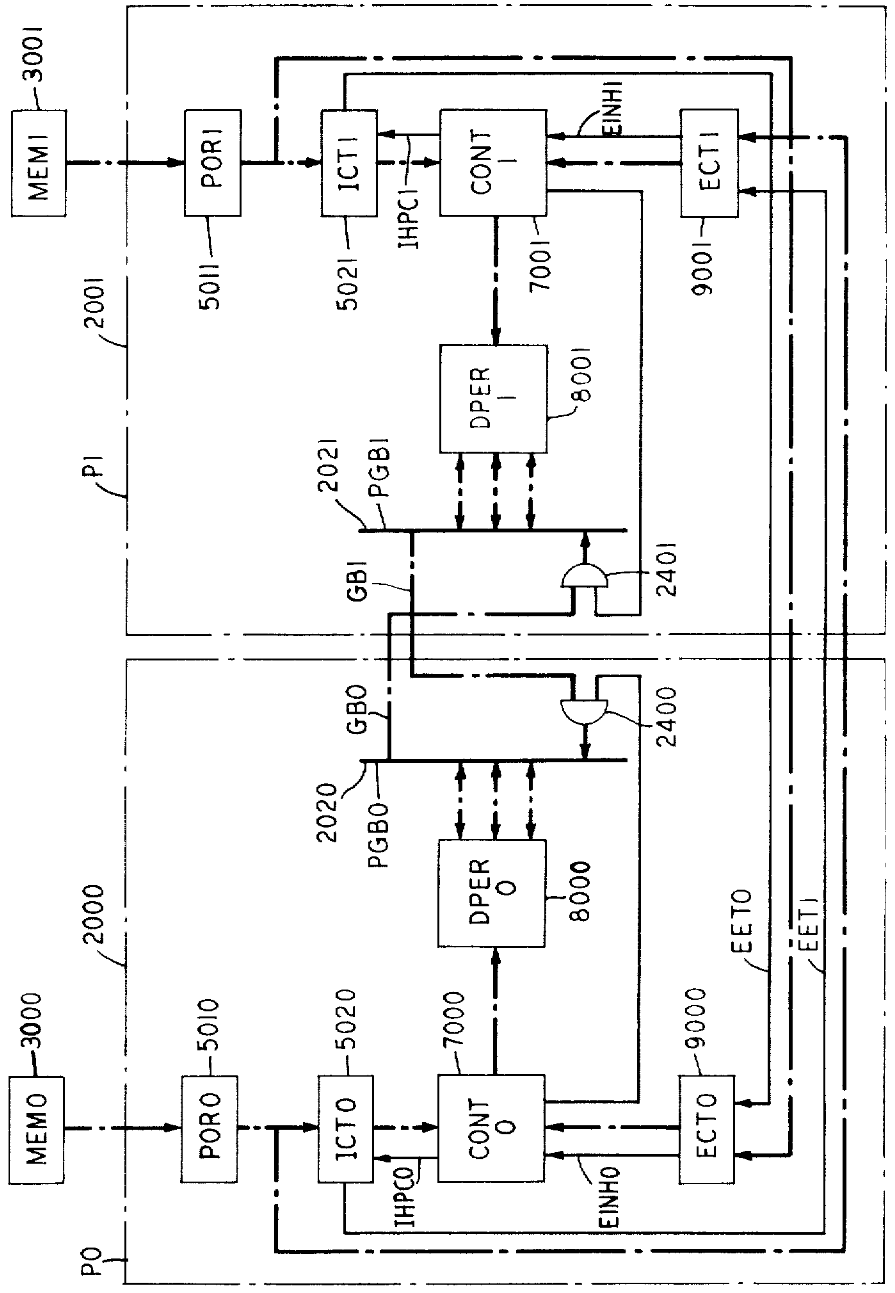
FIG. 13 is a block diagram showing an illustrative multiprocessor organized in accordance with the invention.

The multiprocessor organization illustrated in FIG. 13 is a skeletonized block diagram showing only those parts of the Processors 2000 and 2001 which are pertinent to the invention. Two identical Processors 2000 and 2001 are shown, each having access to a memory 3000 and 3001, respectively. Since the Processors 2000 and 2001 are identical, portions of the following description relate only to one of the Processors 2000, it being understood that it is similarly applicable to the other Processor 2001.

Instructions obtained from Memory 3000 by Processor 2000 are registered in Program Order Register 5010. An instruction registered in PO register 5010 is decoded by Internal Command Translator 5020 which provides discrete output signals defining a data processing operation to be executed in Processor 2000. These signals are applied to Control Circuit 7000, which includes timing and logical gating circuitry. Control Circuit 7000 provides properly sequenced control signals to the Data Processing Execution and Register circuits 8000, which perform the data processing functions needed to execute the operation defined by the instruction in PO register 5010. The Data Processing Execution and Register circuits 8000 communicate selectively with each other over Program Gating Bus 2020, as needed, under control of the control signals from Control Circuit 7000. It is to be understood, although not shown, that each of the Processors 2000 and 2001 selectively obtain instructions from the Memories 3000 and 3001 in sequence according to the results of data processing operation and the order in which the instructions are stored in the respective Memories 3000 and 3001, as is well known in the art. All of the above functions and elements are well known and no detailed description thereof is presented at this time. A more detailed description of certain of the aforenoted functions and elements is given later herein.

Each of the Processors, e.g., 2000, also includes an External Command Translator, e.g., 9000, which is directly connected to the PO register, e.g., 5011, of the other Processor, e.g., 2001. Additionally, the EC translator, e.g., 9000, of each Processor, e.g., 2000, is connected via an enable lead, e.g., EETO, to the IC translator, e.g., 5021, of the other Processor, e.g., 2001. An instruction registered in PO register 5010 in Processor 2000 is decoded by IC translator 5020 which provides in addition to other output signals, a signal on its output conductor EET1, if the instruction is so coded. The signal on EET1 enables EC translator 9001 in Processor 2001. Upon enablement thereof, EC translator 9001 also decodes the instruction registered in PO register 5010 and provides output signals defining a data processing operation to be executed in Processor 2001. This defined operation is executed by the Data Processing Execution and Register circuits 8001 in Processor 2001 at the same time the operation defined by the other output signals from IC translator 5020 is executed in Processor 2000. Thus, a single instruction obtained by one processor from its memory is employed directly to initiate execution of data processing operations in two data processors. These data processing operations may be similar, independent, or cooperative in terms of the result achieved with respect to the two processors.

In each of the data Processors, e.g., 2000, an inhibit lead, e.g. EINHO, connects the EC translator, e.g., 9000, to the Control Circuit, e.g., 7000, in that processor. Activation of this inhibit lead, for example, EINHO, precludes the Control Circuit 7000 from responding to the output signals from IC translator 5020 and also inhibits the generation of clock pulses in Control Circuit 7000 which are employed in resetting the various register circuits of Data Processing Execution and Register circuits 8000. Thus, an instruction registered in the PO register 5011 of Processor 2001 can directly initiate, through EC translator 9000 in Processor 2000, the freezing of all registers in Processor 2000 and inhibit response by Processor 2000 to an instruction registered in PO register 5010.

Program Gating Bus 2020 of Processor 2000 is connected through gating elements 2401 to the Program Gating Bus 2021 of Processor 2001. Similarly, Program Gating Bus 2021 of Processor 2001 is connected through gating elements 2400 to the Program Gating Bus 2020 of Processor 2000. Gating elements 2400, when enabled by Control Circuit 7000, transfer the data on Program Gating Bus 2021 of Processor 2001 to the Program Gating Bus 2020 of Processor 2000. Similarly, gating elements 2401, when enabled by Control Circuit 7001, transfer the data on Program Gating Bus 2020 of Processor 2000 to the Program Gating Bus 2021 of Processor 2001. Thus, the information in any of the registers of the Data Processing Execution and Register circuits 9000 and 9001 can be transferred from one processor to the other in response to a single instruction obtained from memory by only one processor. This is achieved by the decoding of the single instruction by the IC translator of one processor and the EC translator of the other processor to define the operations needed in both processors to perform the necessary gating functions.

The above described multiprocessor organization can be used advantageously to perform the same or different logical operations in different processors on the same or different data parameters under control of a single set of instructions to one processor. Different processors can be evaluating the same data simultaneously according to different criteria. Where trouble is encountered in one processor, another processor can control and diagnose operations of the processor in trouble. One example of such a diagnostic test operation includes the following steps:

1. The first processor freezes the second processor, initializes instruction sequence timing in the second processor, and causes an instruction to be gated into the PO register of the second processor;

2. The first processor causes the second processor to execute the instruction in its PO register;

3. The first processor causes the second processor to gate the content of one of its registers to a register in the first processor and performs a check operation to verify proper execution by the second processor of the instruction. Such test operations can be arranged in a diagnostic program used to evaluate the ability of a processor to function properly.

GENERAL DESCRIPTION (FIGS. 2–13)

For purposes of illustration, this invention is described herein in the environment of a communication switching system. Such a communication switching system is described in the copending application, Ser. No. 868,196, filed Oct. 21, 1969, by T. M. Quinn and F. S. Vigilante, now U.S. Pat. No. 3,587,060, issued June 22, 1971. Reference can be made to that application for details of the communication functions of the system and the call processing function implementation. The system described in the Quinn et al. application employs only a single data processor in combination with a wired logic processor to provide for system control functions. The system contemplated herein employs two identical synchronized data processors and wired logic processors for reliability purposes. Only one processor, the on-line processor, is in control of the system at any given time. The other processor, the off-line processor, under most conditions receives identical input data and instructions as the on-line processor and thus is maintained in synchronous step with the on-line processor. Matching arrangements, not shown or described herein, are used to compare data obtained simultaneously from both processors to insure proper operation of the system.

Since two identical processors are contemplated herein, the designations given to the elements of the respective processors have been coordinated. The last digit of a designation indicates the processor in which the element so designated is contained. The preceding digits or letters define the nature of the element. For example, both Program Order Registers are labeled with designations having 501 as their first three digits. The last digit, either 0 or 1, specifies the Processor 2000 or 2001 in which the particular Program Order Register is contained. Thus PO register 5010 is in Processor 2000 and PO register 5011 is in Processor 2001. Where the descriptions herein relate to both processors generically, only the initial digits or letters of a designation are used. For example, in describing the general operations of the data processors of the system, reference is made to a PO register as 501.

The communication switching system shown herein serves local Subscriber Lines 100, 101 and Trunks 121, 122 to distant offices. In serving the local lines and the trunks, call signaling information originating with both the lines and the trunks must be detected and interpreted and appropriate control actions initiated in accordance therewith. In addition to the input information which originates with the lines and the trunks, the illustrative switching system receives data from a plurality of data sources and is arranged to transmit data to a corresponding plurality of data users.

The two major sources of input information comprise the Scanners 130, 131, 105 and data receivers. The output devices employed herein comprise the Peripheral Access Circuit 120 and a data sender.

The nature of the data which is transmitted via the data sender and the generation of this data will not be considered in detail herein. It is sufficient to note that data transmitted by these arrangements may be utilized in the control of remote switching units and in communication with other switching centers. In the illustrative embodiment of this invention data is transmitted on a maximum of 32 channels at a rate of approximately 800 bits per channel per second. The data received via the data receiver arrangement and the utilization thereof similarly is not detailed herein but rather it is sufficient to note that such data may comprise information from a remote switching unit or data from a distant switching center.

The input and output functions of the illustrative switching system may be classified in accordance with the rate at which such functions occur and the precision with which such functions must be correlated with the passage of time. The functions which require the highest repetition rate and the highest degree of timing precision are performed by the wired logic input-output arrangements 6000 and 6001. This results in substantial savings in complexity and in time in the operation of the Processors 2000 and 2001.

In a system in which the functions which are performed with a high degree of timing precision are implemented by means of a stored program processor, substantial time is expended in monitoring function clocks or in executing program interrupts which are initiated in accordance with such function clocks. For example, in one prior art telephone switching system program interrupts occur at 5 millisecond intervals to assure orderly and timely completion of input-output work functions e.g., dial pulse detection, dial pulse sending). In this prior art system there is no provision for data sending and receiving apart from the call signaling information occurring on subscriber lines and on trunk circuits. In the present system, interrupts, other than maintenance interrupts, occur once every 25 milliseconds rather than at the prior rate of once every 5 to 10 milliseconds.

A basic machine cycle of 3 microseconds is employed. The Clock 504 generates eight phases of clock pulses. Each clock pulse has a duration of 0.75 microseconds and the clock pulses overlap each other by one-half of the clock pulse period or 0.375 microseconds. Certain of the instructions of the instruction set executed by the Processor 200 require only 3 microseconds for execution. Other instructions of the instruction set perform more complex operations and require a number of 3-microsecond machine cycles for their execution. The number of machine cycles varies from two through six. Instructions which require access to the Memory 201 and the Peripheral Access Circuit 120 require a maximum of four machine cycles (12 microseconds) for execution.

The Wired Logic Processor 600 utilizes the clock pulses generated by the Clock Circuit 504 and in addition generates timing sequences which are discretely related to the jobs assigned to the Wired Logic Processor 600. The Processor 200 and the Wired Logic Processor 600 share a Temporary Memory 201. The Wired Logic Processor 600 requires 12 microseconds for the completion of its tasks which require access to the Temporary Memory 201. Whenever the Wired Logic is afforded access to the Temporary Memory 201, the Program Controlled Processor is precluded from accessing the Temporary Memory 201 for a period of 12 microseconds. Accordingly, under certain conditions, the Program Controlled Processor may be forced to sit in an idle state for a period of time up to 9 microseconds, while waiting for access to the shared Temporary Memory 201.

PROGRAM CONTROLLED PROCESSOR 200

A program memory word comprises 22 bits. The word structure employed herein comprises full word length instructions and half word length instructions, and each program memory word may contain one full word length or two half word length instructions. The full word length instructions generally comprise a 5-bit operation code accompanied by an address or data, a transfer-allowed bit and, if space permits, a parity bit. Half word length instructions comprise a 5-bit operation code and a 5-bit address code. The remaining two bits of the 22-bit memory word are used for the transfer-allowed bit and the parity bit. The 5-bit address code of a half word length instruction is used to denote a value or a modifier. For example, a value associated with a rotate instruction specifies the amount of rotation. A modifier associated with a gating operation specifies the source and destination register combination. The transfer-allowed bit is used to detect illegal transfers and serves to indicate hardware faults as well as program faults. The instructions are loaded in memory subject to the restriction that each full word length instruction be assigned a new memory address location. A half word length no-operation (NO-OP) instruction is inserted where necessary to adjust the word boundaries such that each full word length instruction will be stored in a new address location.

The operation of logic circuitry within the Program Controlled Processor 200 is generally synchronous and under control of the Clock Circuit 504. As mentioned earlier, this circuit generates clock signals which define a basic 3-microsecond machine cycle. However, the rate at which instructions can be fetched from the Program Store is once every 6 microseconds. The majority of half word length instructions require one 3-microsecond cycle for execution, so that in many instances two half word length instructions may be executed during a 6-microsecond memory reading period. In the illustrative system, full word length instructions and certain half word length instructions require two or more 3-microsecond cycles for execution. The number of cycles required for each instruction ranges from 1 through 6. The fetching of instructions from the Program Memory 300 and the moving of instructions and data within the Program Controlled Processor 200 are discussed herein with reference to FIGS. 2 through 5. There are two flip-flop registers within the Program Controlled Processor 200 which are associated with communications with the Program Memory 300, namely, the 18-bit PA register 304 and the 22-bit PSB register 306. The contents of the PA register 304 define the memory location to be accessed and the PSB register 306 stores instruction words or data obtained from the Program Memory 300 or data to be written into that memory. The PA register 304 is connected to the Program Memory 300 via Cable 307. The PSB register 306 is connected to the Program Memory 300 via Cable 326. Instruction words are normally read from the program memory in sequence. Hence the contents of the PA register 304 are normally incremented by "1" prior to the reading of the next instruction. This is done under control of the PA logic 305. Occasionally it is necessary to break the sequential chain and to make a transfer to a nonsequential address. The instruction repertoire includes a variety of transfer instructions which cause a transfer address to be gated into the PA register 304. The transfer address may be obtained from various sources within the Program Controlled Processor 200.

As mentioned earlier, the minimum time interval between successive readings of the Program Memory 300 is 6 microseconds. It is desirable that this entire time be available to execute the instructions read from the memory. For this reason the PO register 501 is provided in addition to the PSB register 306. At a predetermined time of the basic machine cycle the contents of the PSB register 306 are gated to the PO register 501, via AND gates 510 and 512, for decoding. Thereafter, the contents of the PA register 304 are incremented by "1" and the newly generated memory address is transmitted to the Program Memory 300 to obtain the next instruction in sequence. In case the instruction in the PO register 501 is a transfer instruction, the transfer address rather than the next sequential address must be used in obtaining the next instruction from the Program Memory 300. If the next sequential address has been read, but a transfer is to be executed, the contents of the PSB register 306 will be discarded. When the contents of the PSB register 306 comprises two half word length instructions, both half word length instructions are gated into the 22-bit PO register 501. The half word length instruction stored in the left-hand half of the PO register 501 is always executed first. Upon completion of execution of the left-hand instruction, the contents of the right-hand half of the PO register 501 are gated into the left-hand half of the same register via AND gate 514. Upon completion of execution of this second half word length instruction, the next instruction or pair of instructions is gated from the PSB register 306 into the PO register 501.

An instruction in the PO register 501 is decoded by means of the Command Translator 502, which produces output signals unique to the instruction found in the PO register 501. The output signals of the Command Translator 502 are combined in the Order Combining Gate Circuit 505 with output signals of the Clock Circuit 504, the Sequence Circuit 506, and the Read and Regenerate Control 503. It is the output signals of the Order Combining Gate Circuit 505 which control the gating actions and logical operations taking place within the Program Controlled Processor 200 and, in certain cases, within the Wired Logic Processor 600.

The Sequence Circuit 506 serves to control the access to the Program Memory 300. Since the various program instruction words require a varying number of 3-microsecond machine cycles for their execution, a circuit must be provided to keep track of the number of cycles yet remaining for execution of a particular instruction in order that new instructions may be obtained from the Program Memory 300 at the correct time. The Sequence Circuit 506 has been provided for this purpose. This circuit is initialized by each instruction and it produces output signals which indicate to the Order Combining Gate Circuit 505 that the next instruction or pair of the instructions must be prepared for execution. The Read and Regenerate Control 503 generates timing signals for use by the Order Combining Gate Circuit 505 in the generation of signals required for the reading of data from the Temporary Memory 201, the regeneration of memory cells which have been read, and the writing of data into the Temporary Memory 201. The cooperation of the Program Controlled Processor 200 with the Memory Access 140 will be described later herein.

As shown in FIGS. 2 through 5, the Program Controlled Processor 200 contains a plurality of flip-flop registers. In general, the content of any one register can be gated to any other register in the processor. This transfer of information is accomplished by means of the Program Gating Bus 202 which also extends to the Wired Logic Processor 600. To transfer data by means of the Program Gating Bus 202 from one register to another, an output gate connected to the source register and an input gate connected to the destination register are both activated. For example, to gate information from the AA register 302 to the CA register 303, AND gates 315 and 312 are activated. Many of the processor's registers are used primarily for specific functions; however, they are not limited to such use. For example, the AA register 302, the CA register 303, and the GR register 203 are used primarily in communication with the Temporary Memory 201. This communication is via the Memory Access 140. Temporary Memory 201 is responsive to clock signals generated by the Clock Circuit 504 and to read and write signals. There are two read conductors, RCSDO and RCSGR. A signal on the first conductor causes the memory location specified by the contents of the CSA register 142 to be read and the data to be transmitted to the DO register 604 via Conductor 241. A signal on the second conductor causes the memory to be read and the data to be transmitted to the GR register 203 via Conductor 240. There are two WRITE conductors and a signal on either of these conductors causes the contents of the CSI register 141 to be written into the memory location specified by the contents of the CSA register 142. The signals on the RCSDO conductor and one of the WRITE conductors are generated by the Order Combining Gate Circuit 912 in the Wired Logic Processor 600 while signals on the RCSGR conductor and the other WRITE conductor are generated by the Order Combining Gate Circuit 505 in the Program Controlled Processor 200. A 16-bit address may be transmitted from either the AA register 302 or the CA register 303 to the CSA register 142 via the Program Gating Bus 202, AND gate 231, OR gate 144, and either AND gate 315 or 316. Data to be written into the Temporary Memory 201 may be gated to the CSI register 141 from GR register 203 via AND gate 232 and OR gate 143, or from other registers by means of the Program Gating Bus 202, AND gate 233, and OR gate 143. The Temporary Memory 201 is a destructive readout memory. Any memory location which is read by the processor must be regenerated to preserve the data for subsequent reading operations. The Temporary Memory 201 does not contain flip-flop registers for storing the data to be held for regeneration. Instead, data read from the memory is gated into either the GR register 203 or the DO register 604 and regeneration data is obtained from the CSI register 141. A sufficient period of time is allowed between the reading and regeneration that the read data can be gated to the CSI register 141 from either the GR register 203 or the DO register 604. Certain instructions of the instruction repertoire of the Program Controlled Processor 200 take advantage of this period of time between the reading and regenerating to alter the data which is used for the regeneration. For example, one instruction causes the contents of the memory location specified by the address in the AA register 302 to be read into the GR register 203, causes the contents of the GR register 203 to be logically combined with the contents of the LR register 204, and causes the logical result to be gated to the CSI register 141 before regeneration takes place.

The LR register 204, the LF register 205, the LM register 206, and the LW register 207 are used in conjunction with instructions which perform a variety of logical operations. The Logic Function Circuit 220 is employed by these instructions and generally the contents of the GR register 203 and of the LR register 204 are combined in accordance with the logical function specified by the contents of the LF register 205. The contents of the LM register 206 are used in the logic function to selectively mask certain bits such that the logic function will be performed only on those bits of the input words for which there exists a "1" in the LM register 206, and a "0" will be generated for all bits for which there exists a "0" in the LM register 206. The resultant data word generated by the Logic Function Circuit 220 is gated to the LW register 207 via the Program Gating Bus 202 and AND gates 234 and 235. If it is desired that the bits on which a logic function has been performed be returned to the GR register 203 but that all other bits of GR register 203 not be disturbed, the Insertion Mask Circuit 208 is employed. This selective insertion into the GR register is accomplished by single rail gating the "1" side of each bit of the LW register 207 to the GR register 203 via the Program Gating Bus 202 and the appropriate AND gates, and simultaneously combining the contents of the LM register 206 and the "0" side of each bit of the LW register 207 and gating the result to the "clear" side of each bit of the GR register 203 via AND gate 236. As a result, a "1" is written into each bit of the GR register 203 for which there was a "" in the LW register 207, and a "0" is written in each bit of the GR register for which there exists a "1" in the LM register 206 and a "0" in the LW register 207. It should be remembered that a "1" can appear only in those bits of the LW register 207 for which there was a "1" in the LM register 206. Consequently, a change is made in only those bits of the GR register 203 for which there exists a "1" in the LM register 206.

The Sum Rotate Circuit 301 is a logic circuit which is used for several purposes. This circuit may be used to rotate the contents of any register by a specified amount by gating the contents of the desired register to the Sum Rotate Circuit 301 via the program gating bus, and by gating the rotated result back to the register from which the data originated. The Sum Rotate Circuit 301 is also used to add the contents of the GR register 203 and the AA register 302. The result may then be placed in any desired register. A specified number may also be added to the contents of either the AA or the GR register by means of the Sum Rotate Circuit 301.

It was mentioned earlier that the PA register comprises 18 bits which form an 18-bit address for the Program Memory 300, and that each memory word comprises 22 bits. A 22-bit memory word has space for at most a 16-bit address in addition to the required 5-bit instruction code and a check bit. Therefore, a transfer instruction needs two bits in addition to the 16-bit address which is stored in the instruction word. For this purpose, certain bits of the Transfer Buffer 400 have been provided. When a transfer is to take place, two bits are obtained from the Transfer Buffer 400 in addition to the 16-bit address. It is, of course, a prerequisite that the appropriate bits of the transfer buffer be loaded before the transfer instruction is executed. This loading may be accomplished by ordinary data handling instructions. The significance and use of each of the bits of the Transfer Buffer 400 are discussed in the aforenoted Quinn et al. application.

Execution of a program may be interrupted to begin execution of other programs in response to interrupt signals generated by the Interrupt Register 520. This register comprises a plurality of interrupt flip-flops each of which is assigned a discrete priority level. Interrupt programs are stored in the Program Memory 300 which are uniquely associated with each of the interrupt flip-flops. The Interrupt Register 520 further comprises circuitry for generating interrupt signals which indicate the priority level of the desired interrupt. The Order Combining Gate Circuit 505 is responsive to the interrupt signals to selectively initiate transfers to the interrupt programs in the Program Memory 300. Such transfers are initiated by jamming an interrupt instruction into the PO register 501 upon completion of the instruction being executed. The interrupt instruction stores the contents of the PA register 304 and the Transfer Buffer 400 in predetermined locations of the Temporary Memory 201 and inserts a transfer address into the PA register 304. The value of the transfer address is a function of the level of interrupt being executed. Thereafter the appropriate interrupt program is executed. Interrupt programs are executed in accordance with the priority levels of the interrupt flip-flop associated with the program. Accordingly, higher level interrupts are completed before lower level interrupts are initiated. However, a higher level interrupt may interrupt a lower level interrupt program.

Certain of the flip-flops of the Interrupt Register 520 are set in response to error signals from the Error Detector 521 when errors are detected within the Program Controlled Processor 200. For example, such error signals are generated in case of a parity error in a reading from a Program Memory 300. One of the interrupt flip-flops is set in response to signals on the 25MS conductor. These last-named signals are generated by a Timing Counter in the Wired Logic Processor 600 and occur approximately once every 25 milliseconds. These timed interrupts provide for the initiation of execution of certain programs on a periodic basis.

In addition to the above described arrangements in Processors 2000 and 2001 for performing data processing functions within themselves, facilities are provided for the communication of data between the processors and for selective execution by each processor of instructions obtained from memory by the other processor.

Program Gating Bus 2020 of Processor 2000 is connected to Program Gating Bus 2021 in Processor 2001 through gate 2401 in Processor 2001. Similarly, Gating Bus 2021 in Processor 2001 is connected to Gating Bus 2020 in Processor 2000 through gate 2400 in Processor 2000. This cross-coupling of the gating busses 2020 and 2021 of the processors serves as a transmission path for information exchange between the processors 2000 and 2001 by selective enablement of the gates 2400 and 2401 under program control.

Each Processor 2000 and 2001 includes an External Command Translator 9000 and 9001 respectively. EC translator 9000 in Processor 2000 is connected directly to the output of PO register 5011 in processor 2001. EC translator 9001 in Processor 2001 is connected directly to the output of PO register 5010 in Processor 2000. In this illustrative embodiment, only the five low order bits of each PO register are available for decoding by the EC Translator of the other processor. It is apparent, however, that any number of instruction bits in the PO register of one processor can be made available to such a translator in another processor in a similar manner.

One output lead from each IC translator 5020 and 5021 is connected to the EC translator 9001 and 9000 in the other processor. Lead EET1 connects IC translator 5020 in Processor 2000 to EC Translator 9001 in Processor 2001. Similarly, lead EETO connects IC Translator 5021 in Processor 2001 to EC Translator 9000 in Processor 2000. Thus, an instruction coded in a particular manner causes both an IC Translator and an EC Translator in the other processor to decode the instruction and provide controlling output signals to both OCG circuits. Control signals are then appropriately provided in both processors to cause cooperative execution of the instruction.

Each Processor 2000, 2001 includes an inhibit flip-flop INHO, INH1 whose states start and stop data processing operations in the respective processors. For example, the inhibit flip-flop INH1 is controlled by signals from OCG circuit 5051 on conductors SINH and RINH1. These signals are provided by OCG circuit 5051 in response to a specific output signal from EC translator 9001 when an instruction in PO register 5010 is appropriately coded. When SET, inhibit flip-flop INH1 applies an inhibit signal to Clock Circuit 5041 and to IC Translator 5021. When so inhibited, IC Translator 5021 provides no output signals and Clock Circuit 5041 provides no timing signals for resetting the various registers in the Processor 2001. Selective control of flip-flop INH1 can be used advantageously to control operations in Processor 2001. For example, the instruction EXC, when registered in PO register 5010, causes the inhibit flip-flop INH1 in the other processor 2001 to be RESET. This permits the other processor 2001 to execute whatever instruction is then present in its PO register 5011. The instruction EXC, still registered in the controlling processor 2000, then causes the inhibit flip-flop INH1 in the other processor 2001 to be SET. Thus, execution of instruction EXC causes the other processor 2001 to be stepped through a program one instruction at a time with provision for analysis of the results by the controlling processor 2000 between steps.

Other instructions (ZOINH and SOINH) can be used in the controlling processor to step the other processor through a sequence of operations one cycle at a time, as opposed to one instruction at a time. This permits detailed analysis of multicycle instruction execution in the other processor by the controlling processor.

The instruction repertoire of the illustrative system comprises the following instructions:

Transfer Instructions

| Code | Description |
|---|---|
| TGR | Transfer to address specified by GR register 203 and bits PFH2 and PFH3 of the Transfer Buffer 400. |
| TLR | Transfer to address specified by LR register 204 and bits PFH2 and PFH3 of the Transfer Buffer 400. |
| TR | If bit 10 of the Transfer Buffer 400 is "0"tr ansfer to address in the PA register 304 modified by 5-bit address specified by the instruction; if bit 10 of the Transfer Buffer 400 is "1," transfer to address in the PA register 304 modified by contents of bits 11 through 15 of the Transfer Buffer 400 and the 5-bit address specified by the instruction. |
| TRA | Transfer to address specified by the instruction and bits PFH2 and PFH3 of a Transfer Buffer 400. |
| TSA | Store bits 0 through 15 of the PA register 304 in Temporary Memory 201 at address location specified by contents of CA register 303, store bits 16 and 17 of the PA register 304 in bits RAP6 and RAP7 of the Transfer Buffer 400, and transfer to address specified by the instruction and the contents of bits PFH2 and PPFH3 of the Transfer Buffer 400. |
| TTSA | Fetch contents of the location of Temporary Memory 201 defined by CA register 303 and insert into bits 0 through 15 of PA register 304, place the contents of bits RAP6 and RAP7 into bits PFHS2 and PFH3 of the Transfer Buffer 400 and into bits 16 and 17 of the PA register 304, and transfer to new address in the PA register 304. |
| PIB(n) | Begin program interrupt: store contents of Transfer Buffer 400 and bits 0 through 15 of PA register 304 at predetermined locations of Temporary Memory 201, store contents of bits 16 and 17 of PA register 304 in bits RAP6 and RAP7 of Transfer Buffer 400, transfer to predetermined wired address modified by n (n = 1 through 7). The value of n determines the three least significant bits of the address. |
| PIE(n) | End program interrupt: restore Transfer Buffer 400 with information from predetermined address of Temporary Memory 201, restore PA register 304 with information from predetermined address of Temporary Memory 201 and contents of bits RAP6 and RAP7 of the Transfer Buffer 400, and transfer to new address in the PA register 304. |
| TCNS | If bit CF8 of the Transfer Buffer 400 is "0," transfer as described for TR instruction; if bit CF8 is "1," advance to next sequential address. |
| TCS | If bit CF8 of the Transfer Buffer 400 is "1," transfer as described for TR instruction; if bit CF8 is "0," advance to next sequential address. |

Test Instructions

| Code | Description |
|---|---|
| 41ST, 4ZT | These two instructions test the lower four bits of the GR register 203 for the all "1's" and all "0's" condition, respectively, and set bit CF8 of the Transfer Buffer 400 if the condition is met. |
| GZT | Test GR register 203 for all "0's" condition and set bit CF8 if condition is met. |
| WZT | Test LW register 207 for all "0's" condition and set bit CF8 if condition is met. |
| MST | This instruction reads a plurality of locations of the Temporary Memory 201 in sequence, combines the read information with the contents of the LR register 204 as specified by LF register 205 and LM register 206, places the result in the LW register 207, and performs an all "0" test on the contents of the LW register. If the desired result is not found, the instruction modifies the read information, writes it into the location from which it was read, reads the next sequential word from the Temporary Memory 201, and performs the same logical operations. Options of the instruction specify whether the desired condition is the all "0" condition or the not all "0" condition of the LW register 207. The number of locations to be so examined is specified by the count in the KR counter 522. This count is decremented each time a word is read from memory and the program advances when the count of "1" is reached. |

Add Instructions

| Code | Description |
|---|---|
| ADXAA | Add X to the AA register 302 (X = 1, 4, 8). |
| ADXCA | Add X to the CA register 303 (X = 1, 4, 8). |
| AD1GR | Add "1" to GR register 203. |
| ADD | Add GR register 203 to contents of AA register 302 and place sum in AA register. |

Zero and Set Instructions

| Code | Description |
|---|---|
| SCA2 | Set bit 2 of CA register 303. |
| SCF | Set bit CF8 of Transfer Buffer 400. |
| SGL | Set bit 0 of GR register 203. |
| ZAA | Zero AA register 302. |
| ZAA2 | Zero bit 2 of AA register 302. |
| ZCA | Zero CA register 303. |
| ZA2 | Zero bit 2 of CA register 303. |
| ZCF | Zero bit CF8 of Transfer Buffer 400. |
| ZDFH | Zero bits DFH0 and DFH1 of Transfer Buffer 400. |

Logic Function Instructions

| Code | Description |
|---|---|
| DLF | Logically combine GR register 203 with LR register 204 as specified by LF register 205 and LM register 206, place result in LW register 207, perform all "O" test on LW register 207 and set bit CF8 of Transfer Buffer 400 if the all "0" condition is found. Besides being gated to the LW register 207 the result may optionally be insertion masked into the GR register 203 as previously explained in this description. |
| AND | Logical AND of GR register 203 and the data word accompanying the instruction. |
| OR | Logical OR of GR register 203 and data word specified by instruction. |
| GTLR2 | Set bit 0 of LR register 204 if bit 0 of GR register 203 equals "0," set bit 1 of LR register 204 if bit 0 of GR register 203 equals "1," and rotate LR register 204 right by two bits. |
| GTLR4 | |

Set the bit of the LR register 204 identified by the binary code in bits 0 and 1 of the GR register 203, and rotate LR register 204 right by four bits.

| | |
|---|---|
| RGR | Rotate GR register 203 right by the number specified by the instruction. |
| RLRX | Rotate LR register 204 right by X (X = 1, 2, 4). |
| VA(n) | Vary logically the word in the Temporary Memory 201 at the address specified by AA register 302 and modified by n. The value of n may be 0, 1, 2, or 3, in which case the two least significant bits of the AA register 302 are given the value of n; n may further represent + 1, +4, +8, in which case the specified value is added to the existing contents of the AA register 302. The information obtained from the memory address specified by the modified contents of the AA register 302 is gated to GR register 203, logically combined with LR register 204. The result is gated to the LW register 207, is insertion masked into the CSI register 141 via the Insertion Mask Circuit 209 and is written into memory at the location from which it was read. |
| VC(n) | This instruction is like VA(n) except that the CA register 303 is used instead of AA register 302. |

Read and Write Instructions

| Code | Description |
|---|---|
| DATA | Read data from the Program Memory 300. This instruction saves the contents of the PA register 304 and gates a data address into the PA register 304 from the AA register 302 and bits DFH0 and DFH1 of the Transfer Buffer 400. Upon receipt of the 22-bit data word into the PSB register 306, bits 0 through 15 of this register are gated to the GR register 203 and bits 6 through 21 are gated into the LW register 207. Thereafter the return address is restored to the PA register 304. |
| RAL(n) | Read data to GR register 203 from the location of the Temporary Memory 201 specified by AA register 302 modified by n [(as explained for instruction VA(n)]; logically combine contents of GR register 203 and LR register 204, place result in the LW register 207 and set bit CF8 if the LW register 207 contains all "o's." |
| RCL(n) | Like RAL(n) except that CA register 303 is used in place of AA register 302. |
| RDA(n) | Read into GR register 203 from the location of Temporary Memory 201 specified by AA register 302 modified by n (as previously explained). |
| RDC(n) | Like RDA(n) except that CA register 303 is used instead of AA register 302. |
| RED | Read into GR register 203 from location of Temporary Memory 201 specified by the address accompanying the instruction. |
| WPS | Write into Program Memory 300. This instruction saves the contents of the PA register 304 as a return address, obtains a new address from the AA register 302 and bits DFH0 and DFH1 of the Transfer Buffer 400 and places this address in the PA register 304. Bits 0 through 15 of the GR register 203 are gated into bits 0 through 15 of the PSB register 306 and bits 10 through 15 of the LW register 207 are gated into bits 16 through 21 of the PSB register 306. After the contents of PSB register 306 are written into memory, the instruction restores the return address to the PA register 304. |
| WRI | Write contents of GR register 203 into Temporary Memory 201 at the location specified by CA register 303. |
| WRA(n) | Write GR register 203 into Temporary Memory 201 at location specified by AA register 302 modified by n (as explained earlier). |
| WRC(n) | Like WRA(n) except that CA register 303 is used instead of AA register 302. |

Register-to-Register Gating

| Code | Description |
|---|---|
| AAX(n) | Gate AA register 302 to register n (n = GR register 203, LR register 204, CA register 303). |
| CAX(n) | Gate CA register 303 to register n (n = GR register 203, LR register 204, AA register 302). |
| EAXGR | Gate EA register 700 to GR register 203. |
| GRX(n) | Gate GR register 203 to register n (n = LR register 204, LF register 205, LM register 206, AA register 302, CA register 303, KR counter 522, EA register 700). |
| GRXXLW | Exchange contents of GR register 203 with contents of LW register 207. |
| FIL | Gate 5-bit data word accompanying the instruction into bits 11 through 15, and set bit 10, of the Transfer Buffer 400. |
| FILH | Gate two bits of the data word accompanying the instruction into bits PFH2 and PFH3 of the Transfer Buffer 400. |
| LFYGR | Gate LF register 205 to GR register 203. |
| LGR | Gate data word accompanying the instruction into GR register 203. |
| LLM | Gate data word accompanying the instruction into LM register 206. |
| LLR | Gate data word accompanying the instruction into LR register 204. |
| LMXGR | Gate LM register 206 to GR register 203. |
| LRX(n) | Gate LR register 204 to register n (n = GR register 203, AA register 302, CA register 303, KR counter 522). |
| LWX(n) | Gate LW register 207 to register n (n = GR register 203, LR register 204). |
| SAXGR | Gate Scanner Answer Register 601 to GR register 203. |
| TBXGR | Gate Transfer Buffer 400 to GR register 203. |
| TCXGR | Gate Timing Counter 801 to GR register 203. |
| VIC | Gate ISC flip-flop 722 to bit 0 of GR register 203, logically combine GR register 203 with LR register 204 and gate bit 0 of the result to ISC flip-flop 722. |

Wired Processor Interface Instructions

| Code | Description |
|---|---|
| XTNWO | External network order: gate GR register 203, LR register 204, and bits 0 through 5 of a register in the Wired Processor 600 to Peripheral Access Circuit 120. |
| XTSCO | External scanner order: gate the scanner address stored in a register of the Wired Processor 600 to Peripheral Access Circuit 120 (the resulting scanner answer is received in the LR register 204). |
| XTSC(n) | This instruction reads into the GR register 203 the scanner last-look word from the location of Temporary Memory 201 specified by the address in the CA register 303 and transmits the scanner address |

stored in a register of the Wired Processor 600 to the Peripheral Access Circuit 120. The instruction performs logical operations on the resulting scanner answer received in the LR register 204 and the last-look word stored in the GR register 203, and performs a "0" test on the logical result. If the all "0" condition is met, the address in the CA register 303 is incremented by 1; the next sequential last-look word is read from the Temporary Memory 201 into GR register 203; the contents of a register in the Wired Processor 600 are incremented by the value of n (n = 1, 2, 4) and transmitted to the Peripheral Access Circuit 120; the new scanner answer is combined with the last-look word and the "0" test is again performed. This instruction repeats the above-described operations until either a nonzero result is found or the count in the KR counter 522 equals 1. When either of these conditions is encountered, the program advances to the next instruction. The KR counter 522 is loaded by program before the present instruction is executed. This counter is decremented by the present instruction each time a scanner answer is received.

Miscellaneous

| Code | Description |
|---|---|
| NOP | No operation. This instruction when executed causes no significant changes in any part of the program controlled processor or its environment. |

COOPERATIVE Instructions

In addition to the instructions described hereinabove, a number of instructions are provided for controlling cooperative operations of both processors responsive to an instruction obtained from memory by only one processor. Each such instruction is a full word instruction. The 5-bit operation code and 5 bits of the address code are translated by the IC translator 502 just as for a half-word instruction. In addition to defining operations in the processor receiving the instruction, the IC translator 502 provides an enabling signal to the EC translator 900 in the other processor. The EC translator 900 decodes an additional 5 bits of the address code of the instruction. Generally speaking, in this illustrative embodiment, the processor obtaining such an instruction from memory is the on-line processor then in control of the system, and the other processor is off-line. This class of instruction is employed for communication between the processors and to implement simultaneous cooperative functions in both processors.

In general, cooperative instructions can define any of the instructions listed above which are half-word instructions. Thus, substantially all logical functions can be initiated in both processors by an instruction registered in the PO register 501 of only one processor. The logical functions can be identical or different and can operate on data independently obtained by the respective processors. Additionally, a number of cooperative instructions serve to provide a powerful maintenance facility, which permits one processor to exercise and diagnose the operations of another processor. In general, any function available for performance in the on-line processor can be combined with any function available for performance in the off-line processor to produce a cooperative operation in both processors. The list presented below illustrates some specific functions in the on-line and off-line processors which can be specified in instructions of the cooperative instruction type.

| On-line Code | Description<br>Description |
|---|---|
| GBIGP | Gate Gating Bus 202 of off-line processor bits 17-16 to Transfer Buffer 400 of on-line processor bits 3-2, and gate Gating Bus 202 of off-line processor bits 15-0 to GR register 203 of on-line processor bits 15-0. |
| AAIGB | Gate AA register 302 of on-line processor to Gating Bus 202 of on-line processor. |
| GPIGB | Gate Transfer Buffer 400 of on-line processor bits 3-2 to Gating Bus 202 of on-line processor, and gate GR register 203 of on-line processor bits 15-0 to Gating Bus 202 of on-line processor bits 15-0. |
| INOP | No operation in on-line processor. |
| GBILWG | Gate Gating Bus 202 of off-line processor bits 21-6 to LW register 207 of on-line processor, and gate Gating Bus 202 of off-line processor bits 15-0 to GR register 203 of on-line processor bits 15-0. |
| GBIGR | Gate Gating Bus 202 of off-line processor bits 15-0 to GR register 203 of on-line processor bits 15-0. |
| GRIGB | Gate GR register 203 of on-line processor bits 15-0 to Gating Bus 202 of on-line processor bits 15-0. |
| IWGIGB | Gate LW register 207 of on-line processor bits 15-0 to Gating Bus 202 of on-line processor bits 15-0, and gate GR register 203 of on-line processor bits 15-0 to Gating Bus 202 of on-line processor bits 15-0. |
| GBIOR | Gate Gating Bus 202 of off-line processor bits 21-6 to LW register 207 of on-line processor bits 15-0, and gate Gating Bus 202 of off-line processor bits 15-0 to GR register 203 of on-line processor without clearing either the GR register 203 or the LW register 207 of the on-line processor. |

| Off-line Code | Description |
|---|---|
| EGRGB | Gate GR register 203 of off-line processor to Gating Bus 202 of off-line processor. |
| ZOINH | RESET the INH flip-flop of the off-line processor. |
| EICLK | Stop Clock Circuit 504 of off-line processor. |
| ENOP | No operation in off-line processor. |
| WOPS | Write contents of PO register 501 of off-line processor into program memory 300 of off-line processor at the location specified in PA register 304 of off-line processor. |
| EPOGB | Gate PO register 501 of off-line processor bits 21-0 to Gating Bus 202 of off-line processor bits 21-0. |
| EAAGB | Gate AA register 302 of off-line processor bits 15-0 to Gating Bus 202 of off-line processor bits 15-0. |
| ESCLK | Start Clock 504 of off-line processor. |
| SOINH | SET the INH flip-flop of off-line processor. |
| EPAGB | Gate PA register 304 of off-line processor to Gating Bus 202 of off-line processor. |
| EGBPA | Gate Gating Bus 202 of on-line processor to PA register 304 of off-line processor. |
| EGBPO | Gate Gating Bus 202 of on-line processor to PSB register 306 of off-line processor, and then gate PSB register 306 of off-line processor to PO register 501 of off-line processor. |
| EXC | Off-line processor execute instruction in PO register 501 of off-line processor and then stop. |
| EGBAA | Gate Gating Bus 202 of on-line processor to AA register 302 of off-line processor. |
| EGBGR | Gate Gating Bus 202 of on-line processor to GR register 203 of off-line processor. |

The above are merely illustrative of some representative types of functions which can be selectively combined into cooperative instructions to achieve cooperative operations in both processors. As noted above, logical and arithmetic functions also can be so combined. It can be seen that any register in the off-line processor can be cleared by combining an on-line NOP (no operation) with a gating function in the off-line processor between its Program Gating Bus 202 and the register to be cleared, since zero information is present on the Gating Bus 202 of the on-line processor during a no-operation execution.

Appropriate ordering of cooperative instructions and judicious interleaving thereof with other instructions provides a system in which an on-line processor can completely control an off-line processor in executing its own program or in executing instructions provided by way of the on-line processor. This is a powerful trouble diagnosis tool which permits an on-line processor to analyze thoroughly the operation of the off-line processor on the basis of selected multi-instruction program execution results, selected single instruction execution results, or single cycle execution results.

There has been described but one illustrative application of the principles of our invention and, to one skilled in the art, many other applications of these principles will be apparent. For example, although the principles of this invention have been described in the terms of a multiprocessor system employing redundant processors for controlling a communication switching system, such principles may be applied to multiprocessors having a plurality of non-redundant processors executing different programs and performing different functions in their normal mode of operation.

What is claimed is:

1. In combination,
a plurality of data processors, each comprising
means for selectively obtaining program instructions from memory in accordance with address information,
an instruction register for storing instructions selectively obtained from memory,
internal decoder means for decoding instructions stored in said instruction register,
execution means controlled by said internal decoder means in accordance with an instruction stored in said instruction register for performing a set of logic functions specified by said instruction;
external decoder means in one of said processors for decoding instructions stored in said instruction register of another of said processors;
and said execution means of said one processor controlled by said external decoder in accordance with said instruction stored in said instruction register of said other processor for performing a set of logic functions specified by said instruction.

2. The combination according to claim 1 wherein
said set of logic functions performed by said execution means of said one processor under control of said external decoder means of said one processor is different from said set of logic functions performed by said execution means of said other processor under control of said internal decoder means of said other processor.

3. The combination according to claim 2 wherein
said execution means of said one and said other processors are connected by gating elements selectively controlled by said execution means of said one and said other processors,
and said sets of logic functions comprise transfers of information between said execution means of said one and said other processors through said gating elements.

4. The combination according to claim 1 wherein
said one processor comprises inhibiting means controlled by said execution means of said one processor for inhibiting said internal decoder means of said one processor,
and said set of logic functions performed in said one processor comprises activation of said inhibiting means by said execution means.

5. The combination according to claim 1 wherein
said one processor comprises inhibiting means controlled by said execution means of said one processor for inhibiting said internal decoder means of said one processor,
and said set of logic functions performed in said one processor comprises deactivation of said inhibiting means by said execution means of said one processor.

6. The combination according to claim 1 wherein
said execution means of each of said processors comprises means for clearing information from data storage elements in said execution means,
said one processor comprises inhibiting means for inhibiting activation of said clearing means of said one processor,
and said set of logic functions performed in said one processor comprises activation of said inhibiting means by said execution means of said one processor.

7. The combination according to claim 1 wherein
said execution means of each of said processors comprises means for clearing information from data storage elements in said execution means,
said one processor comprises inhibiting means for inhibiting activation of said clearing means of said one processor,
and said set of logic functions performed in said one processor comprises deactivation of said inhibiting means by said execution means of said one processor.

8. The combination according to claim 1 wherein
said program instruction obtaining means of each of said processors is controlled by said execution means of said processor in accordance with address information stored in said execution means of said processor,
and said set of logic functions performed in said one processor comprises the control by said execution means of said one processor of said program instruction obtaining means of said one processor for obtaining from memory an instruction having a memory address defined by address information stored in said execution means of said one processor and storing said obtained instruction in said instruction register means of said one processor.

9. The combination according to claim 1 wherein
said execution means of each of said processors comprises a plurality of registers and functional circuits and transmission means for transferring information between selected of said registers and functional circuits under control of said execution means in accordance with said instruction,
said transmission means of said one and said other processors are interconnected by controllable gating elements controlled by said execution means of said one and said other processors,
said set of logic functions performed in said other processor comprises transfer of information from a selected register in said other processor specified in said instruction to said transmission means of said other processor,
and said set of logic functions performed in said one processor comprises the transfer of information through said gating elements from said transmission means of said other processor to a selected register in said one processor specified in said instruction.

10. The combination according to claim 9 wherein
said selected register in said one processor comprises an address register which controls said program instruction obtaining means of said one processor by defining the memory address from which an instruction is obtained.

11. The combination according to claim 9 wherein
said one processor comprises means controlled by said execution means of said one processor for transferring information from said transmission means of said one processor to said instruction register of said one processor,
and said selected register in said one processor comprises said instruction register of said one processor.

12. The combination according to claim 1 wherein
said execution means of said one processor comprises
data storage means,
address storage means for storing said address information for said one processor, clearing means for selectively clearing data from said data storage means and address information from said address storage means, means for inhibiting said clearing means and said internal decoding means of said one processor, means for transferring information selectively between said data storage means, said address storage means, and said instruction register of said one processor;

said execution means of said other processor is connected through controllable gating elements to said transferring means in said one processor;

and said external decoder means controls said execution means of said one processor in accordance with a sequence of instructions selectively obtained from memory by said other processor and sequentially stored in said instruction register of said other processor to selectively activate and deactivate said inhibiting means, said transferring means, and said gating elements so as to control said one processor in executing a particular instruction or sequence of instructions defined by information transferred from said other processor in a step-by-step manner.

13. In combination, memory means for storing instructions defining data processing functions;

a pair of data processors, each comprising an instruction register for storing an instruction obtained from memory by said processor, a plurality of registers and processing circuits, transmission means for selectively interconnecting said plurality of registers and processing circuits for data transfer therebetween, gating means for transferring data between said transmission means and the transmission means of the other processor, decoder means connected to said instruction register and to the instruction register of the other processor for identifying the functions defined by the instruction stored in one of said instruction registers, and logic control means controlled by said decoder means for controlling selectively said transmission means, said processing circuits, and said gating means to execute said identified functions.

14. The combination according to claim 13 wherein each of said processors comprises inhibit means connected to said logic control means for inhibiting a portion of said decoder means of one of said processors and for inhibiting clearance of information from said registers in said one processor, said logic control means of said one processor controlled by the active portion of said decoder means of said one processor for controlling the execution of a function identified by an instruction stored in said instruction register of the other processor, and said logic control means of said other processor controlled by said decoder means of said other processor for controlling the execution of a function identified by said instruction stored in said instruction register of said other processor.

15. In combination, memory means for storing instructions defining data processing functions;

first and second data processors, each comprising a plurality of registers and processing circuits, transmission means for selectively interconnecting said plurality of registers and processing circuits for data transfer therebetween, gating means for transferring data between said transmission means and the transmission means of the other processor;

said first processor comprising a first instruction register for storing an instruction obtained by said first processor from said memory means, first decoder means connected to said first instruction register for identifying the functions defined by said instruction stored in said first instruction register, first logic control means connected to and controlled by said first decoder means for controlling selectively said transmission means, said processing circuits and said gating means in said first processor to execute said identified function in said first processor;

said second processor comprising second decoder means connected to said first instruction register for identifying other functions defined by said instruction stored in said first instruction register, and second logic control means connected to and controlled by said second decoder means for controlling selectively said transmission means, said processing circuits and said gating means in said second processor to execute said identified other functions in said second processor.

16. The combination according to claim 15 wherein said second processor comprises a second instruction register for storing an instruction obtained by said second processor from said memory means, third decoder means connected to said second instruction register for identifying the functions defined by said instruction stored in said second instruction register, said second logic control means connected to and controlled by said third decoder means for controlling selectively said transmission means, said processing circuits and said gating means in said second processor to execute said functions defined by said instruction stored in said second instruction register, inhibit means controlled by said second logic control means for inhibiting control of said second logic control means by said third decoder means, said second decoder means responsive to a specific instruction stored in said first instruction register for controlling said second logic control means to activate said inhibit means.

17. The combination according to claim 16 wherein said second decoder means is responsive to another specific instruction stored in said first instruction register for controlling said second logic means to selectively operate said transmission means and said gating means of said second processor for transferring data from said transmission means of said first processor to a selected one of said plurality of registers and data processing circuits.

18. The combination according to claim 17 wherein said second decoder means is responsive to a third specific instruction stored in said first instruction register for controlling said second logic control means to deactivate said inhibit means.

* * * * *

UNITED STATES PATENT OFFICE

CERTIFICATE OF CORRECTION

Patent No. 3,678,467 Dated July 18, 1972

Inventor(s) Eric Nussbaum, Wing Noon Toy, Melvin Neil Woinsky

It is certified that error appears in the above-identified patent and that said Letters Patent are hereby corrected as shown below:

Column 9, line 7, after "a" quotes should read --"1"--.

Column 11, line 29, after "and" delete "PPFH3" and insert --PFH3--;

line 35, after "bits" delete "PFHS2" and insert --PFH2--.

Signed and sealed this 9th day of January 1973.

(SEAL)
Attest:

EDWARD M.FLETCHER,JR.
Attesting Officer

ROBERT GOTTSCHALK
Commissioner of Patents